(12) United States Patent
Smith et al.

(10) Patent No.: US 8,751,351 B1
(45) Date of Patent: Jun. 10, 2014

(54) SYSTEMS AND METHODS FOR PROVIDING A MARKETPLACE OF GOODS SUBJECT TO DISTRESSED FINANCIAL OBLIGATIONS

(75) Inventors: Arthur Quentin Smith, Fredericksburg, TX (US); Bradly Jay Billman, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 24 days.

(21) Appl. No.: 12/482,547

(22) Filed: Jun. 11, 2009

(51) Int. Cl.
*G06Q 40/00* (2012.01)
*G06Q 10/00* (2012.01)
*G06Q 40/02* (2012.01)

(52) U.S. Cl.
CPC ............... *G06Q 40/00* (2013.01); *G06Q 10/00* (2013.01); *G06Q 40/02* (2013.01)
USPC ............... 705/36 R; 705/26; 705/35; 705/38; 235/380

(58) Field of Classification Search
USPC .......... 705/35, 38; 701/35; 235/494; 455/426
See application file for complete search history.

(56) References Cited

U.S. PATENT DOCUMENTS

| | | | | |
|---|---|---|---|---|
| 5,644,726 A * | 7/1997 | Oppenheimer | | 705/36 R |
| 5,826,240 A * | 10/1998 | Brockman et al. | | 705/11 |
| 5,930,775 A * | 7/1999 | McCauley et al. | | 705/36 R |
| 6,067,533 A * | 5/2000 | McCauley et al. | | 705/38 |
| 6,192,347 B1 * | 2/2001 | Graff | | 705/36 R |
| 6,691,094 B1 * | 2/2004 | Herschkorn | | 705/37 |
| 7,020,631 B2 * | 3/2006 | Freeman et al. | | 705/36 R |
| 7,107,239 B2 * | 9/2006 | Graff | | 705/36 R |
| 7,213,001 B2 * | 5/2007 | DeSane | | 705/37 |
| 7,392,221 B2 * | 6/2008 | Nabe et al. | | 705/38 |
| 7,516,099 B2 * | 4/2009 | Schneider | | 705/38 |
| 7,526,446 B2 * | 4/2009 | Aguais et al. | | 705/38 |
| 7,555,443 B2 * | 6/2009 | Chandran et al. | | 705/10 |
| 7,558,756 B1 * | 7/2009 | Wesly et al. | | 705/38 |
| 7,587,361 B2 * | 9/2009 | Cleary et al. | | 705/38 |
| 8,429,057 B1 * | 4/2013 | Dale | | 705/37 |
| 2002/0007342 A1 * | 1/2002 | Sellers et al. | | 705/38 |

(Continued)

FOREIGN PATENT DOCUMENTS

GB 2424289 A * 9/2006
WO WO 03090130 A1 * 10/2003 ............. G06F 17/60

OTHER PUBLICATIONS

Paige Bowers, Trouble Selling Your Home? Why Not Try a House Swap, Mar. 5, 2009 (TroubHm).*

(Continued)

*Primary Examiner* — Chika Ojiaku
(74) *Attorney, Agent, or Firm* — Baker and Hostetler LLP

(57) ABSTRACT

Systems and methods for a financial institution to compile information regarding customer loans and items/assets securing the loans to create an environment in which troubled debtors may place an asset into a pool of assets for resale/exchange and to be released of obligations to repay the loan associated with the asset. In some implementations, a customer may replace the asset with another asset in the pool, where the replacement asset imposes a reduced (or no) obligation on the debtor. The pool of assets may include real estate, automobiles, major electronics, major appliances, artwork, etc. In some implementations, the financial services provider may be able to place an asset into the pool of goods before it becomes damaged, destroyed or goes missing by modeling customer behavior and anticipating a pending default on a loan.

11 Claims, 4 Drawing Sheets

(56) References Cited

U.S. PATENT DOCUMENTS

| | | | |
|---|---|---|---|
| 2002/0065753 A1* | 5/2002 | Schloss et al. | 705/35 |
| 2003/0069837 A1* | 4/2003 | Mills et al. | 705/38 |
| 2003/0110111 A1* | 6/2003 | Nalebuff et al. | 705/35 |
| 2003/0172016 A1* | 9/2003 | Chandran et al. | 705/35 |
| 2003/0233246 A1* | 12/2003 | Snapp et al. | 705/1 |
| 2004/0117319 A1* | 6/2004 | Oshima et al. | 705/75 |
| 2004/0138911 A1* | 7/2004 | Oshima et al. | 705/1 |
| 2004/0138912 A1* | 7/2004 | Campbell | 705/1 |
| 2004/0153330 A1* | 8/2004 | Miller et al. | 705/1 |
| 2004/0181473 A1* | 9/2004 | Duke | 705/35 |
| 2005/0010423 A1* | 1/2005 | Bagbey et al. | 705/1 |
| 2005/0044033 A1* | 2/2005 | Gelson et al. | 705/37 |
| 2005/0262013 A1* | 11/2005 | Guthner et al. | 705/38 |
| 2006/0143112 A1* | 6/2006 | Donarski et al. | 705/38 |
| 2006/0190350 A1* | 8/2006 | Maas | 705/26 |
| 2006/0287895 A1* | 12/2006 | Salas | 705/4 |
| 2007/0011084 A1* | 1/2007 | George | 705/38 |
| 2007/0011085 A1* | 1/2007 | George et al. | 705/38 |
| 2007/0016519 A1* | 1/2007 | Blount et al. | 705/38 |
| 2007/0250395 A1 | 10/2007 | Ghafari | |
| 2008/0065514 A1 | 3/2008 | Eaton | |
| 2008/0172393 A1* | 7/2008 | Baird | 707/10 |
| 2008/0201217 A1* | 8/2008 | Bader et al. | 705/14 |
| 2008/0255964 A1* | 10/2008 | Milton | 705/27 |
| 2009/0006248 A1 | 1/2009 | Haberstroh | |
| 2009/0048955 A1* | 2/2009 | Cznadel et al. | 705/35 |
| 2009/0265265 A1* | 10/2009 | Collett et al. | 705/37 |
| 2010/0030699 A1* | 2/2010 | Caputo et al. | 705/36 R |
| 2010/0088220 A1* | 4/2010 | Langley | 705/38 |
| 2010/0274710 A1* | 10/2010 | Misraje et al. | 705/38 |
| 2010/0293114 A1* | 11/2010 | Khan et al. | 705/500 |
| 2010/0299245 A1* | 11/2010 | Kaufman | 705/38 |
| 2010/0306100 A1* | 12/2010 | Kaufman | 705/38 |
| 2011/0047059 A1* | 2/2011 | Manley | 705/37 |
| 2012/0005036 A1* | 1/2012 | Erickson | 705/26.2 |

OTHER PUBLICATIONS

D.O. Volente, House-Swapping Trend Emerges, Jan. 31, 2008, ConsumerAffairs.com (HouseSwap).*
GoSwap.org-Exchange, For Free-Home, NowMoves, Inc. 2006—www.webarchive.org/web/20071006 (GoSwap).*
Dictionary of Real Estate Terms, by Friedaman, Jack P., Harris, Jack C. and Lindeman J. Bruce, pp. 117-118, $5^{th}$ ed. 2000. (Distress).*
Comprehensive Mortgage Loan Guide Bancaja, Apr. 27, 2003, p. 14-17 (Bancaja).*
Google Search Results Page listing date of Comprehensive Mortgage Loan Guide ( Bancaja Date).*
"The Lateral Mortgage Swap", www.DebtRecoveryInitiative.org, 3 pages.

* cited by examiner

SYSTEMS AND METHODS FOR PROVIDING A MARKETPLACE OF GOODS SUBJECT TO DISTRESSED FINANCIAL OBLIGATIONS

BACKGROUND

Many people face financial crisis situations caused by personal or family illness, the loss of a job, or overspending, it can seem overwhelming. Often, the crisis can be overcome, but many people do not consider available options such as redefining a budget, contact creditors, managing secured loans, or credit counseling. Thus, people are faced with more difficult decisions, such as walk away from their financial obligations or have their equity repossessed. These drastic solutions are devastating to a person's credit rating, as well as personal lives.

In addition, deeper financial difficulties may involve specialists to unwind the damage. Bankruptcy attorneys, accountants and other trained experts may need to be retained at substantial cost to individuals having difficulty, which further exacerbates the problems that individuals incur during a crisis.

SUMMARY

Systems and methods for a financial institution to compile information regarding customer loans and items/assets securing the loans to create an environment in which troubled debtors may place an asset into a pool of assets for resale/exchange and to be released of obligations to repay the loan associated with the asset. In some implementations, a customer may replace the asset with another asset in the pool, where the replacement asset imposes a reduced (or no) obligation on the debtor. The pool of assets may include real estate, automobiles, major electronics, major appliances, artwork, etc. The replacement asset may be of a same class of asset. For example, a vehicle may be replaced by another vehicle.

In some implementations, the financial services provider may be able to place an asset into the pool of goods before it becomes damaged, destroyed or goes missing. Further, the financial services provider may promote goodwill amongst its customers, because those customers in financial difficulty may be provided a solution to an otherwise difficult situation other than repossession or foreclosure.

The foregoing is a summary and thus contains, by necessity, simplifications, generalizations, and omissions of detail. Those skilled in the art will appreciate that the summary is illustrative only and is not intended to be in any way limiting.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the present disclosure is not limited to the specific methods and instrumentalities disclosed. In the drawings.

DETAILED DESCRIPTION

Disclosed herein are systems and methods for a financial institution to compile information regarding customer loans and items/assets securing the loans to create an environment in which troubled debtors may place an asset into a pool of assets for resale/exchange and to be released of obligations to repay the loan associated with the asset. In some implementations, a customer may replace the asset with another asset in the pool. For example, the debtor may have a loan for vehicle having a payment of $600 per month. The debtor may find that he/she is unable to make the monthly payment due to financial constraints. Rather than repossessing the vehicle or otherwise negatively affecting the debtor's credit rating, a financial services provider may allow the debtor to place the vehicle into the pool of goods, which is maintained within a listing database. The debtor may be released from his/her obligation under the loan once the vehicle is placed into the pool of goods and the financial services provider obtains title, and/or the vehicle is sold to a subsequent purchaser. In some implementations, the debtor may place the vehicle (or other goods or property) into the pool of goods and replace it with a more cost-effective vehicle (e.g. a vehicle that would incur a payment of $200 per month).

The above may also reduce losses to the financial services provider. For example, the financial services provider may be able to place an asset into the pool of goods before it becomes damaged, destroyed or goes missing. Further, the financial services provider may promote goodwill amongst its customers, because those customers in financial difficulty may be provided a solution to an otherwise difficult situation other than repossession or foreclosure.

Figure 1:
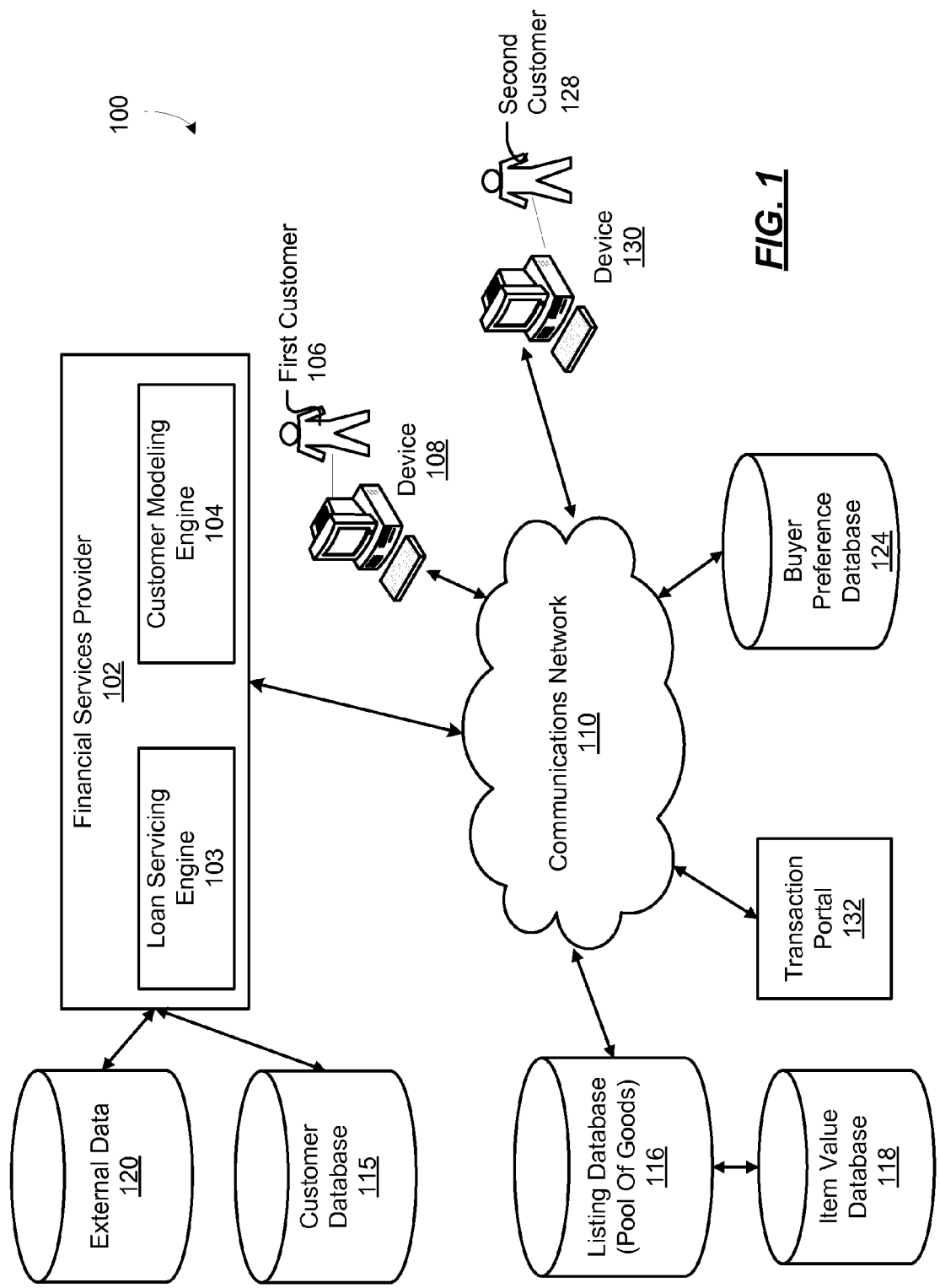
FIG. 1 illustrates an example environment in which implementations described herein may be employed.

FIG. 1 illustrates an example environment 100 in which implementations described herein may be employed. Within the environment 100, a financial services provider 102 may provide insurance and/or financing to buyers of properties, automobiles, major appliances, etc. The financial services provider 102 may have a loan servicing engine 103 and a customer modeling engine 104. The loan servicing engine 103 may attend to the administration a loan made from the financial services provider 102 to a customer. The loan servicing engine 103 may generate and send monthly payment statements, collect payments, maintain records of payments and balances, collect and paying taxes and insurance (and managing escrow and impound funds), remit funds to the note holder, and following up on delinquencies.

The customer modeling engine 104 may receive information from loan servicing engine 103 and/or other subsystems with the financial services provider infrastructure to predict customer behavior with regard to defaulting on loans. Predictive statistical modeling techniques may be applied to determine the models. The modeling process is used to create a statistical model of whether a customer is likely to default using the information contained in a customer databases 115.

The model may employ a simple linear equation to weigh the factors, a neural network, etc. For example, a bank is likely to take into account statistically relevant factors such as payment timeliness, account balances, increasing usage of credit cards, applications for additional loans, etc. These predictors may indicate that a customer is likely to default on a loan based on historical data maintained by the financial services provider 102. The customer modeling engine 104 may provide an indication to the financial services provider 102 that a customer may be likely to default on a loan. The financial services provider 102 may use this information to contact the customer to determine if the customer would like to place the asset in to a pool of assets for sale by the financial services provider 102. The pool of assets may include real estate, automobiles, major electronics, major appliances, artwork, etc.

Within the environment 100, there may be a first customer 106 and a device 108, such as a personal computer, associated with the first customer 106. In the present example, the first customer 106 may be the debtor desiring to be released from a, e.g., loan obligation associated with a vehicle. The environment 100 may include a listing database 116 that contains listings of the goods/assets for sale/exchange within the pool. The first customer 106 or financial services provider 102 may submit information about an asset to the listing database 116. The first customer 106 or financial services provider 102 may also opt for an appraisal that may be generated from information contained in an item value database 118, an external database 120 or customer database 115. The listing database 116 may be indexed such that it is searchable.

Within the environment, there may be a second customer 128 and associated device 130, such as a personal computer, that may be used to provide information to the financial services provider 102. The information provided by the second customer 128 to the financial services provider 102 may be search requests for items of interest that the second customer 128 would like to purchase. In some implementations, the second customer 128 may also submit information to a buyer preference database 124, such that when a preferred item becomes available within the pool of goods listed in the listing database 116, the second customer 128 may be notified.

The listing database 116 may include listings and details about items, such as real estate, automobiles, major electronics, major appliances, artwork, etc., presently owned by, e.g., the first customer 106 who may be experiencing financial difficulties and to which a loan originated or serviced by financial services provider 102 is secured. As noted above, the asset may be placed in the pool to release the first customer 106 from the obligations to pay for the asset. In some implementations, the first customer 106 may replace the asset with another item in the pool that will impose a reduced obligation. For example, the listing database 116 may provide basic information about the assets in the pool that can be searched by the second customer 128. For example, for real property, the listing database 116 may contain information such as, a number of bedrooms and bathrooms, square footage, location, etc. about a house. In another example, for an automobile, the listing database 116 may contain information about the make, model, year, color, etc. of the automobile. In another example, the listing database may contain information about personal property, such as diamond rings, watches, etc.

The external database 120 may include one or more databases of information that may be ingested by the financial services provider in making determinations regarding its customers. For example, the external database 120 may include, but is not limited to, economic trend data, a real estate sales data, employment data, gross domestic product (GDP) data, etc. The external database 120 may be any data used by the financial services provider 102 in its decision making processes. For example, the financial services provider 102 may receive economic trend information indicating a downturn in the economy. As such, the financial services provider 102 may decide to curtail the number of loans it originates to customers. In some implementations, the external database 120 may be maintained internally to the financial services provider 102. For example, the financial services provider 102 may maintain its own database of real estate pricing trends, automobile values by geographic regions, etc.

A transaction portal 132 provides an environment in which a second customer 128 may view, search and purchase assets within the pool of goods listed in the listing database 116. In some implementations, the second customer 128 may log into a website provided by the financial services provider 102 to accept the transaction portal 132. The financial services provider 102 may arrange for one or more of the following that typically occur when purchasing a major asset, such as a home, a vehicle, a large compliance, etc.: an inspection of the asset, an appraisal of the assets, comparison costs of the asset to other like assets, etc. The financial services provider 102 may then complete the transaction with a second customer 128.

Each of the databases 115, 116, 118 and 124, either separately or combined, may be provided as a database management system, an object-oriented database management system, a relational database management system (e.g. Oracle, Access, etc.), a file system or another conventional database package. Further, the databases can be accessed via a Structure Query Language (SQL) or other tools known to one of ordinary skill in the art.

The network 110 may be any network that facilitates wireless communications, may also include wired communication capabilities, and may communicate with other wired and wireless networks. Any and all such networks are contemplated as within the present disclosure. Examples of such networks include telephony radio networks such as global system for mobile communication ("GSM") networks and code division multiple access ("CDMA") networks, wireless computer networks such as Wi-Fi and IEEE 802.11 networks, and wired networks such as local area networks ("LANs"), wide area networks ("WANs"), intranets, and the Internet. The network 110 represents any possible combination of such networks, including a wireless network that may connect to the Internet and communicate with other devices that are connected, directly or indirectly, to the Internet.

The transactions associated with the assets may involve multiple businesses (e.g. banking, insurance, title attorneys, inspection companies, appraisers, etc.). The financial services provider 102 provides a solution to this problem by integrating separate financial/insurance components. A property and casualty component may handle homeowners insurance, a real estate listing service may provide listings and search capabilities of the listings, and a banking component may set up and relieve loan obligations. Thus, a collaboration of the components in the environment 100 may result in the aggregation of the asset exchange (i.e., pool of goods) into one Internet site and/or one company (e.g., entity 102). In some implementations, the listing database 116 and pool of goods may be maintained by a third party. For example, if the pool of goods includes automobiles, then the listing database 116 and pool of goods may be maintained by a car dealership in communication with the financial services provider 102 to enable the exchange and/or purchase of the vehicle previously owned by the first customer 106.

Figure 2:
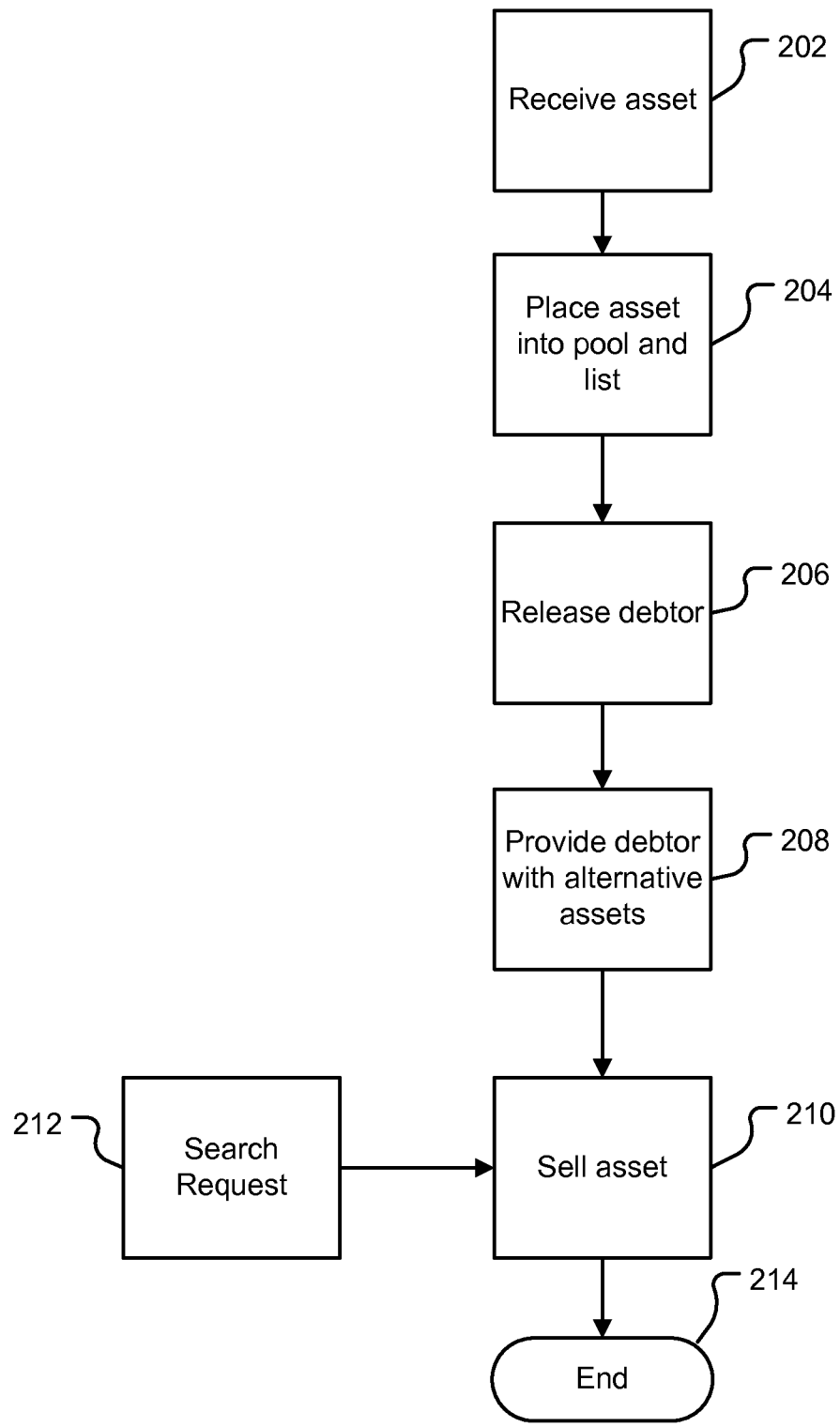
FIG. 2 illustrates an operational flow diagram and may be performed to place assets in any pool of goods from distressed customers or others.

FIG. 2 illustrates an operational flow diagram 200 and may be performed to place assets in any pool of goods from distressed customers or others. In accordance with the operational flow, the assets may be made available for sale to other customers of the financial services provider or to the general public. At 202, an asset is received. In some implementations, the first customer 106 may have a loan with the financial services provider 102 for an asset, for which the first customer is having difficulties making payments. As noted above, the asset may be real property, personal property, major appliances, etc. The first customer 106 may approach the financial services provider 102 to provide the asset, or the financial services provider may request that the first customer 106 provide the asset. In some implementations, the customer may be required to provide the asset to the financial services provider 102 as a condition of the loan. In some implementations, the asset may not be subject to a loan, but is used by the first customer 106 to satisfy a portion or a remainder of the loan for an asset that is subject to the loan. For example, the first customer 106 may owe more on a vehicle than the fair market value of the vehicle. The first customer 106 may provide the vehicle and another item of value (e.g., a gold watch) to the financial services provider 102.

At 204, the asset is placed into the pool and listed. The financial services provider 102 may list the asset in the listing database 116 and include details about the asset, such that it may be searched by prospective buyers (e.g. second customer 128). The listing may be updated as more information becomes known about the asset. The asset may be physically transferred from the debtor/first customer 106 to the financial services provider 102, or the customer 106 may retain possession and control of the asset and/or "rent" the asset until it is sold (i.e., pay for the use/enjoyment of the asset).

At 206, the debtor may be released from his/her obligations. In accordance with implementations herein, the financial services provider 102 may be able to resell the asset by listing it in the listing database 116, such that it may be purchased by other customers or individuals at large. Accordingly, a financial service provider's losses, if any, may be minimized as the asset remains under the control of the financial services provider in consideration for releasing the debtor. In some implementations, conditions may be placed on the release of the debtor. For example, the release may be conditioned on an acceptable quality of the asset. Also, the release may be conditioned on the sale of the asset from the pool of goods listed in the listing database 116. As such, the operations performed at 206 may be conditional or optional, and may occur after the sale the asset (see, 210).

At 208, the debtor may be provided with alternative assets. The financial services provider 102 may provide the debtor (e.g., first customer 106) and option to replace the asset with an alternative asset that is in the listing database 116. The replacement asset may be of a same class of asset. For example, the financial services provider 102 may allow the debtor to exchange a more expensive vehicle with a less expensive vehicle. The less expensive vehicle may allow the debtor to reduce or eliminate loan payments associated with the replacement less expensive vehicle. It is noted that the examples herein are with respect to a vehicle, however may be with respect to any asset placed into the pool of goods listed in the listing database 116.

At 210, the asset is sold. Once the asset is listed in the listing database 116, it may be searchable by prospective buyers (e.g., second customer 128). The second customer 128 may access the transaction portal 132 and enter search parameters for items of interest (at 212). If the asset of the first customer 106 is of interest to the second customer 128, the second customer may purchase the asset using the transaction portal 132. In some implementations, the second customer 128 may have entered buyer preferences into the buyer preference database 124. The preference is listed in the database 124 may be run against the listing database 116 on a periodic basis to determine if any items listed in the listing database 116 may be interesting to the second customer 128. If a match is found, the second customer may be notified at, e.g. device 130 that an item of interest has been placed into the listing database 116. The second customer 128 may automatically or manually purchase the item based on preferences set in the buyer preference database 124. For example if the item is a match to be second customer's preferences, then the item may be purchased automatically based on the price being within a predetermined range. In some implementations, the second customer 128 after receiving notification at the device 130, may log onto the transaction portal 132 to complete the transaction. At 214, the process ends.

Figure 3:
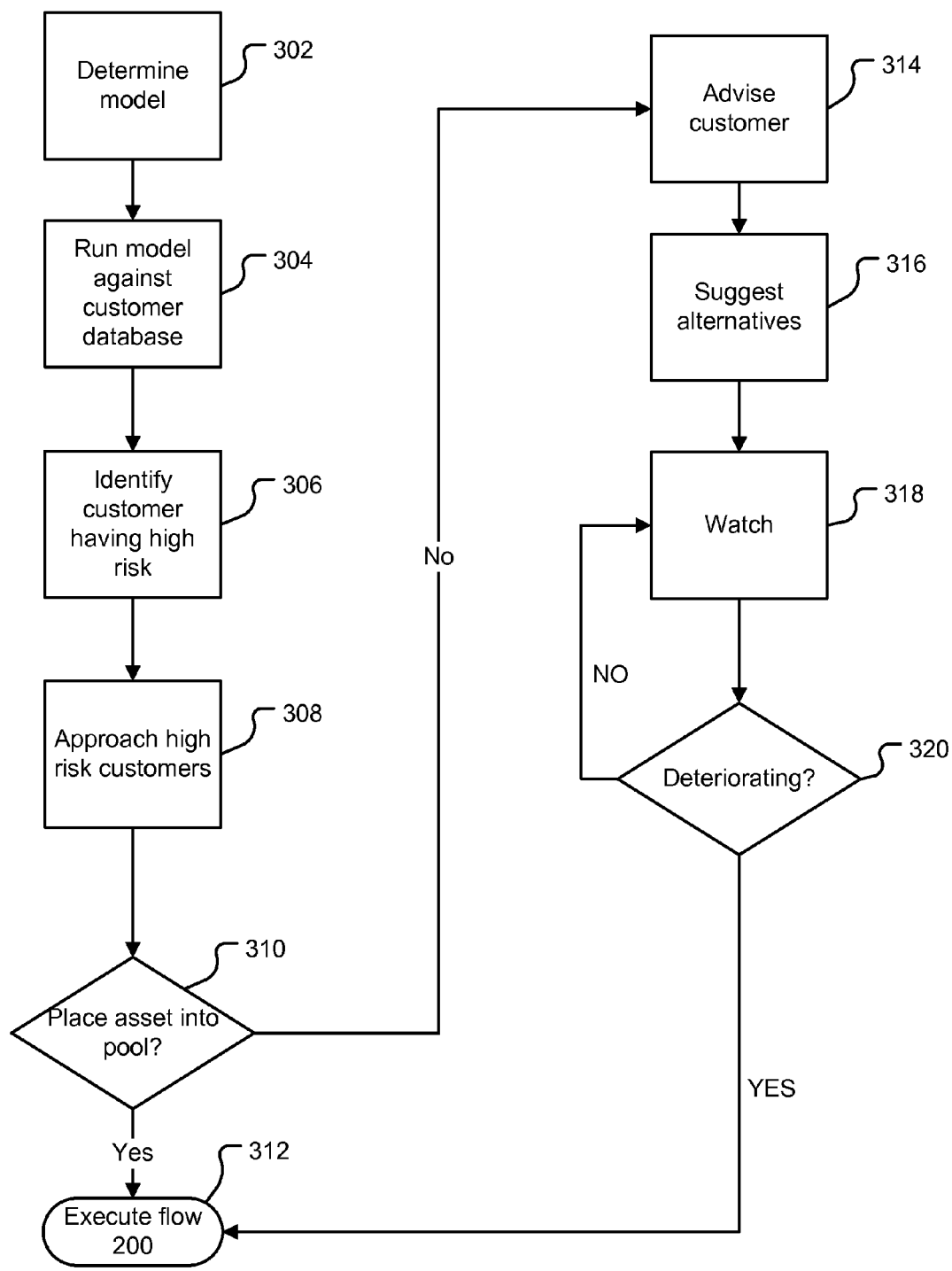
FIG. 3 illustrates an operational flow diagram of processes performed to model and determine customers that may be in financial difficulty and may be requested to place an asset securing a loan into the pool of goods.

FIG. 3 illustrates an operational flow diagram 300 of processes performed to model and determine customers that may be in financial difficulty and may be requested to place an asset securing a loan into the pool of goods. At 302, a model is determined. The customer modeling engine 104 may receive information from loan servicing engine 103, the external database 120, the customer database 115, and/or other subsystems to determine a model predictive of customer behavior with regard to defaulting on loans. As noted above, predictive statistical modeling techniques may be applied to determine the models.

In some implementations, the model may take into account the following non-limiting global factors received from external database 120: economic trends, real estate pricing trends, unemployment data, GDP, Consumer Price Index (CPI) information, etc. In some implementations, model may account for data in the customer database 115 that is particular to a customer. This data may include, but is not limited to: payment history, changes in marital status, changes employment status, changes in credit usage, changes in credit score, balance reductions in savings and other accounts, withdrawals from retirement accounts, lapsing of other products within the financial services providers offerings, etc. The information described above may be used as statistically relevant predictors within the model. It is noted that other statistically relevant information may be used as predictors in generating the model at 302.

At 304, the model is run against the customer database. The model may be run in accordance with business rules set by the financial services provider. The model may be run against a particular set of customers or all customers within the customer database 115. By applying the predictive model to customers within the customer database 115, high-risk customers showing a likelihood of defaulting on a loan related to an asset may be identified.

The high-risk customers are identified at 306. These customers may exhibit high debt, diminishing income, etc. Also, a set of customers may be identified as a low-risk. Such customers may be those having high net worth, few liabilities, excellent payment histories, etc.

At 308, customers identified at 306 may be approached by the financial services provider 102. This may include communications with the customers (e.g., first customer 106) by e-mail, telephone, written mail, etc. identifying customers as may be being on the brink of financial distress. The communication may ask if the customer would like to be relieved of a financial obligation associated with the asset by placing the asset into the pool of goods.

If at 310, the customer chooses to place the asset into the pool of goods, then at 312 the process flow 200 described above with reference to FIG. 2 may be executed. In some implementations, the customer may be required to place the asset in the pool as a condition of the loan. However, if at 310 the customer chooses not to place the asset into the pool of goods, the financial services provider may provide financial advice and counseling to the customer at 314. This may include, for example, advising the customer of the potential pitfalls of defaulting on a loan obligation. At 316, alternatives may be suggested to the customer. For example, if the customer presently has a three-year loan on a vehicle, the financial services provider 102 may suggest refinancing into a five-year loan to reduce the monthly payments.

At 318, the customer may be placed on a watch. A flag may be set in the customer database 115 to more closely check the customer's loan payment status or other factors identified at 302. This may enable the financial services provider 122 quickly catch a situation where a loan may be defaulted on by the customer. At 320, it is determined if the customer's financial situation is deteriorating. If so, then the financial services provider may require the customer place the asset into the pool of goods as described above regarding the process flow 200. Otherwise, at 320, the process returns to 318 to maintain the watch on the customer.

Thus, as described above, methods and systems for providing an exchange of assets that are subject to a loan that may be close to, or in default provides a mechanism by which the loan holder (i.e., the financial services provider) may take ownership of the asset, relieve the debtor of obligations under the loan, and place into a pool of goods offered for sale/exchange with other customers or purchasers at-large. By making the asset available to others, the loan holder may reduce losses, offer the debtor a solution other than foreclosure or repossession, and offer the debtor an alternative asset to replace the asset placed into the pool.

Figure 4:
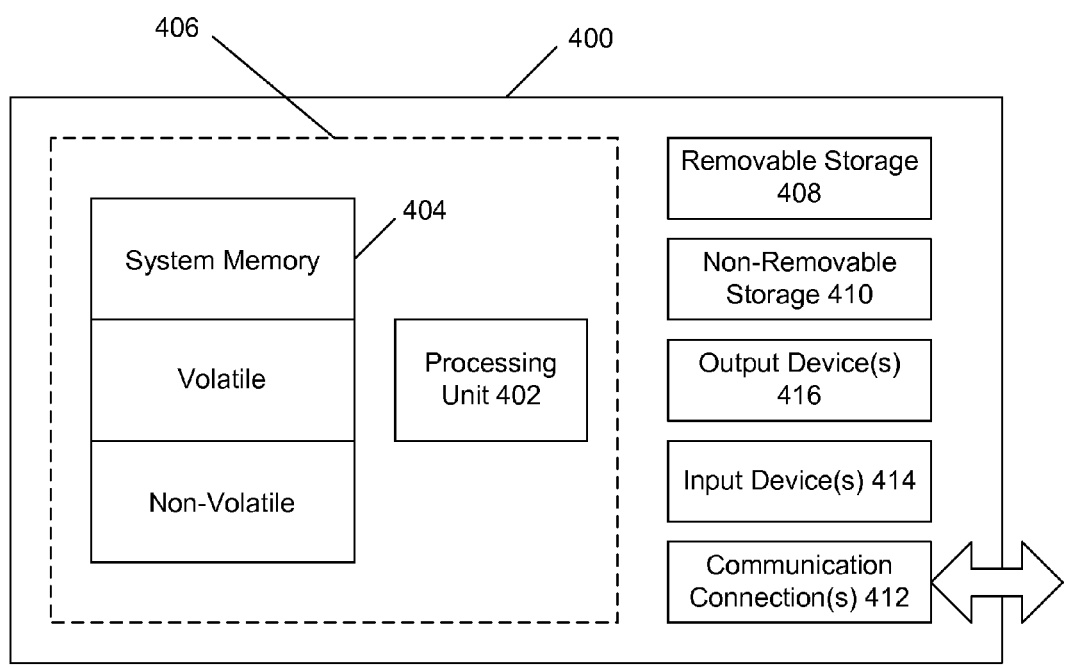
FIG. 4 illustrates an exemplary computing environment.

FIG. 4 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, PCs, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules being executed by a computer, may be used. Generally, program modules include routines, programs, objects, components, data structures, etc., that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 4, an exemplary system for implementing aspects described herein includes a computing device, such as computing device 400. In its most basic configuration, computing device 400 typically includes at least one processing unit 402 and system memory 404. Depending on the exact configuration and type of computing device, system memory 404 may be volatile (such as random access memory (RAM)), non-volatile (such as read-only memory (ROM), flash memory, etc.), or some combination of the two. This most basic configuration is illustrated in FIG. 4 by dashed line 406.

Computing device 400 may have additional features and/or functionality. For example, computing device 400 may include additional storage (removable and/or non-removable) including, but not limited to, magnetic or optical disks or tape. Such additional storage is illustrated in FIG. 4 by removable storage 408 and non-removable storage 410.

Computing device 400 typically includes a variety of computer-readable media. Computer-readable media can be any available media that can be accessed by computing device 400 and include both volatile and non-volatile media, and removable and non-removable media. By way of example, and not limitation, computer-readable media may comprise computer storage media and communication media.

Computer storage media include volatile and non-volatile, and removable and non-removable media implemented in any method or technology for storage of information such as computer-readable instructions, data structures, program modules or other data. System memory 404, removable storage 408, and non-removable storage 410 are all examples of computer storage media. Computer storage media include, but are not limited to, RAM, ROM, Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media may be part of computing device 400.

Computing device 400 may also contain communication connection(s) 412 that allow the computing device 400 to communicate with other devices. Communication connection(s) 412 is an example of communication media. Communication media typically embody computer-readable instructions, data structures, program modules, or other data in a modulated data signal such as a carrier wave or other transport mechanism, and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media. The term computer-readable media as used herein includes both storage media and communication media.

Computing device 400 may also have input device(s) 414 such as a keyboard, mouse, pen, voice input device, touch input device, etc. Output device(s) 416 such as a display, speakers, printer, etc. may also be included. All these devices are well known in the art and need not be discussed at length here.

Computing device 400 may be one of a plurality of computing devices 400 inter-connected by a network. As may be appreciated, the network may be any appropriate network, each computing device 400 may be connected thereto by way of communication connection(s) 412 in any appropriate manner, and each computing device 400 may communicate with one or more of the other computing devices 400 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD- ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for providing an asset exchange marketplace, the system comprising:
    a processor; and
    a memory communicatively coupled with the processor, the system configured to:
    receive information about an asset from a first customer of a financial institution, wherein the financial institution has financed the asset for the first customer and the asset is listed in a listing database that includes a pool of assets, wherein each asset in the pool of assets is subject to one of a plurality loans from the financial institution, wherein the pool of assets is listed in the listing database by the financial institution;
    list the asset in the listing database that is indexed;
    evaluate a condition of the asset to determine a value of the asset;
    exchange, for the first customer, the asset with a replacement asset listed in the listing database prior to a sale of the asset from the listing database;
    indicate that the first customer is released from a financial obligation of one of the plurality of loan agreements when the value of the asset is determined to be above a threshold provided by the financial institution; and
    provide a rental option to the first customer to retain physical possession of the asset until a replacement asset is provided to the first customer from the pool of assets or the asset is automatically sold a second customer of the financial institution based upon a parameter of the asset that is entered into a buyer preference database by the second customer and the financial institution finances the asset for the second customer.

2. The system of claim 1, wherein the system is further configured to provide a transaction portal to make the asset available to others, wherein the transaction portal receives a request from a purchaser to search a listing database of the assets, and wherein the transaction portal returns results of the request to the purchaser.

3. The system of claim 1, wherein the exchange of the asset with a replacement asset listed in the listing database places a reduced financial obligation on the debtor than the financial obligation associated with the asset.

4. The system of claim 3, wherein the subsystem is further configured to obtain a title to the asset; and at least one subsystem that passes title to the purchaser.

5. The system of claim 3, wherein the system is further configured to determine terms and conditions for a subsequent loan for the replacement asset; and at least one subsystem that provides a subsequent loan to the debtor.

6. A system for releasing a financial obligation through an exchange of an asset subject to the financial obligation, comprising:
    a processor; and
    a memory communicatively coupled with the processor, the system configured to:
    determine an amount of the financial obligation of a first customer to a financial services provider for the asset, wherein the financial services provider has financed the asset for the first customer;
    evaluate a condition of the asset to determine a value of the asset;
    exchange, for the first customer, the asset with a replacement asset listed in the listing database prior to a sale of the asset from the listing database;
    release the first customer of the financial obligation if the value is greater than the financial obligation as determined by the financial services provider;
    place the asset into an exchange pool of assets to make the asset available for purchase by a second customer of the financial services provider, wherein the exchange pool of assets is maintained by the financial services provider and each asset in the exchange pool of assets are subject to at least one of a plurality of loan agreements financed by the financial services provider; and
    provide a rental option to the first customer to retain physical possession of the asset until a replacement asset is provided to the first customer from the exchange pool of assets or the asset is automatically sold to a second customer of the financial services provider based upon a parameter of the asset that is entered into a buyer preference database by the second customer, the replacement asset having a reduced financial obligation as compared to the asset and the financial service provider finances the asset for the second customer.

7. The system of claim 6, wherein the system is further configured to provide a transaction portal to make the asset available to others, wherein the transaction portal receives a request from a purchaser to search a listing database of the assets, and wherein the transaction portal returns results of the request to the purchaser.

8. The system of claim 7, wherein the system is further configured to obtain a title to the asset; and pass the title to the purchaser of the asset.

9. The system of claim 7, wherein the buyer preference database queries listings of assets made available through the transaction portal to determine at least one likely match for the purchaser.

10. The system of claim 6, wherein the financial services provider holds title to the asset.

11. The system of claim 10, wherein the asset is purchased by a purchaser who is a customer of the financial services provider, and wherein the financial services provider provides financing to the purchaser of the asset.

* * * * *